United States Patent [19]

Parker et al.

[11] 4,269,172
[45] May 26, 1981

[54] SOLAR WATER-HEATING APPARATUS

[76] Inventors: Peter D. Parker; Robert N. Walton; Lawrence J. Walton, all of 8 Sunshine Blvd., Miami Keys, Queensland, Australia, 4217

[21] Appl. No.: 848,458

[22] Filed: Nov. 4, 1977

[30] Foreign Application Priority Data

Nov. 8, 1976 [AU] Australia .............................. PC8037
Feb. 4, 1977 [AU] Australia .............................. PC8945

[51] Int. Cl.³ ............................................. F24J 3/02
[52] U.S. Cl. .................................. 126/450; 126/448; 126/DIG. 2; 165/56; 165/76; 165/169
[58] Field of Search ........ 126/270, 271, 432, 446–450, 126/DIG. 2; 237/1 A; 165/168, 169, 171, 56, 172, 173, 76, 176, 46, 48, 49; 29/157 R, 157.3 R, 157.3 A

[56] References Cited

U.S. PATENT DOCUMENTS

| 3,039,453 | 6/1962 | Andrassy | 126/271 |
| 3,965,887 | 6/1976 | Gramer et al. | 126/271 |
| 3,991,742 | 11/1976 | Gerber | 126/271 |
| 4,000,850 | 1/1977 | Diggs | 237/1 A |
| 4,060,070 | 11/1977 | Harter | 126/271 |
| 4,076,026 | 2/1978 | Copping | 126/271 |
| 4,080,955 | 3/1978 | Sandstrom | 126/271 |
| 4,112,921 | 9/1978 | MacCracken | 126/271 |

Primary Examiner—James C. Yeung
Attorney, Agent, or Firm—DeLio and Montgomery

[57] ABSTRACT

A solar hot-water system having an absorber formed of plastic ducting adapted to be arranged unobtrusively on a roof surface whereby the water is heated by means of direct radiation from the sun and by means of conduction from the roof surface on which the ducting is supported.

26 Claims, 13 Drawing Figures

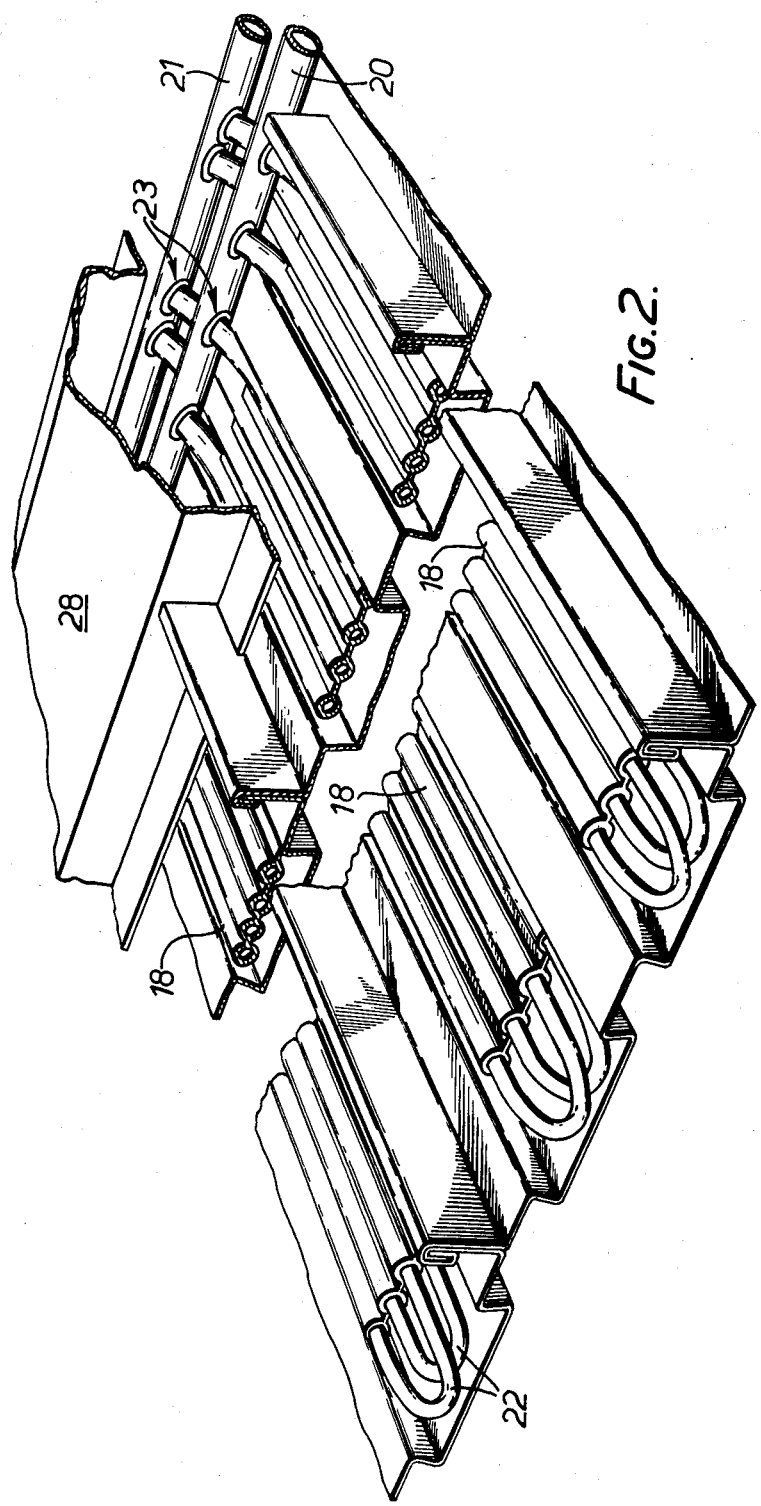

SOLAR WATER-HEATING APPARATUS

This invention relates to a method of and apparatus for heating water.

At present there are many solar water-heating assemblies available which operate efficiently to provide hot water for domestic purposes or at a lower temperature for say swimming pool heating or space heating. A major disadvantage of the presently available apparatus is their cost, mainly because of the copper and stainless steel content in their construction, together with the unsightly appearance of the installation. Such installations commonly comprise a conspicuous device placed on a visible portion of a supporting roof and having a shape which does not blend with the surroundings. Solar heating installations are particularly unsightly when one absorber is positioned on the roof for supplying the domestic hot water and another absorber is positioned on the roof for supplying the lower temperature hot water for say pool heating or space heating.

An object of the present invention is to provide hot water heating apparatus which will overcome the abovementioned disadvantages and which will be reliable and efficient in use. Other objects and advantages of the invention will hereinafter become apparent.

With the foregoing and other objects in view, this invention resides broadly in solar water-heating apparatus including a header having a inlet for water to be heated; a manifold arranged to communicate with said header through a flexible duct assembly adapted to be supported directly on a roof or other sun-exposed supporting surface, and a hot water discharge outlet from said manifold.

The present invention also resides in the provision of ducting members for solar water-heating purposes and comprising a resilient plastic extrusion member of indefinite length and having a plurality of substantially identical passageways extending longitudinally therethrough and disposed in spaced side by side relationship.

In addition, the present invention includes a roof sheet for supporting such ducting members and comprising a rectangular body portion extending between upstanding complementary side engagement portions whereby said sheet may be connected in operative edge to edge overlapping relationship with a similar sheet at each side thereof and said rectangular body portion including a re-entrant recess extending parallel to said side engagement portions and arranged to closely accommodate therein said resilient ducting member whereby the latter may be operatively retained in said recess by forcing said ducting member through the entrance of, and into, said re-entrant recess.

In order that the invention may be more readily understood and put into practical effect, reference will now be made to the accompanying drawings which illustrate the invention and wherein:

FIG. 2 is a cut-away perspective view of portion of the roof section shown in FIG. 1;

Figure 10:
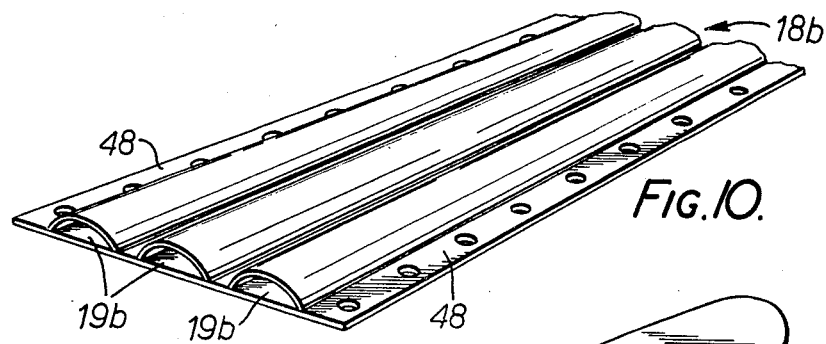
FIG. 10 is a perspective view of portion of an alternate form of ducting made in accordance with the invention.
Figure 11:
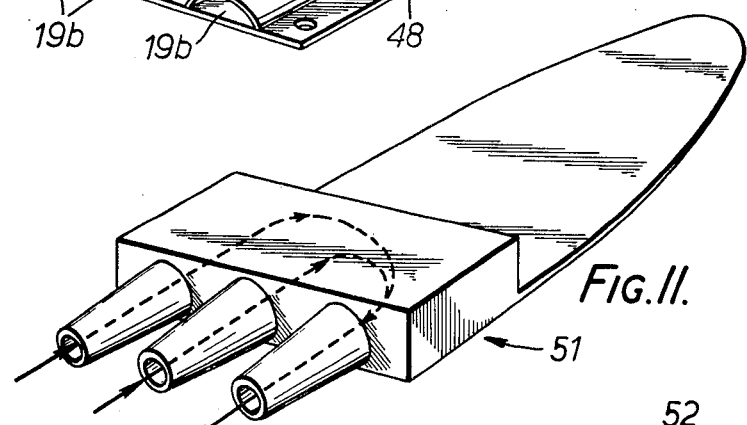
Figure 12:
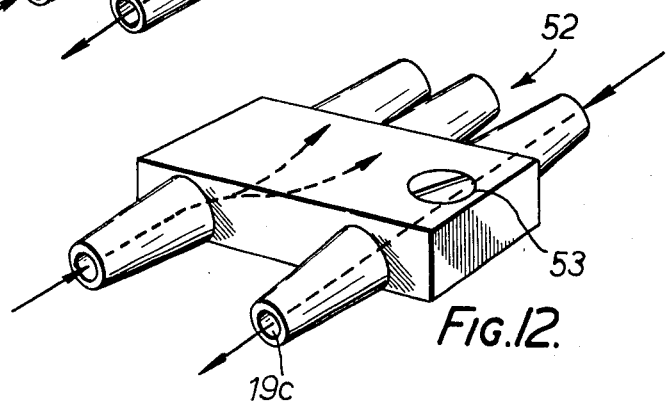
Figure 13:
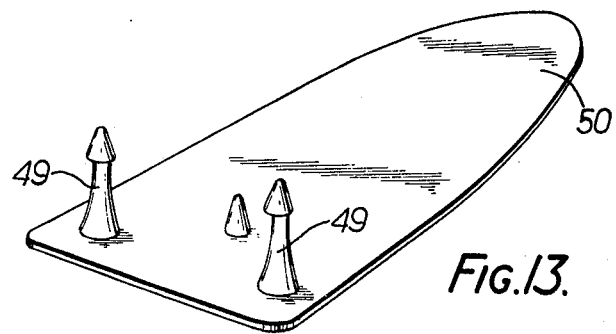

FIG. 11 illstrates a return adaptor for use with the ducting illustrated in FIG. 10;

FIG. 12 is a control valve adaptor for use with the ducting illustrated in FIG. 10; and FIG. 13 illustrates a connector engageable with the ducting illustrated in FIG. 10 for securing same to a roof structure.

In a typical pool installation, re-circulated water is pumped from the pool and returned via a filtration plant. In the present invention, the pumped pool water is directed, prior to passage through the filtration plant, to the heating apparatus and then back through the filtration plant to the pool. The heating apparatus includes a header disposed in or adjacent the guttering of the roof, or at the peak of the roof as desired, and is provided with a plurality of outlet apertures each of which is adapted to communicate with a respective passageway of one of a plurality of spaced elongate ducting members which extend away from the header in an exposed position across and in close contact with the roof for passage of water from the header to an outlet manifold connected in similar manner whereby the water pumped through said ducting absorbs solar heat by direct radiation as well as by conduction from the roof surface which acts as a large heat collector. This feature ensures that efficient use is made of the available space without overly detracting from the original appearance of the roof. Furthermore the ducting may be formed from say extruded P.V.C. material or the like, so that the installation costs may be minimised. The present invention, according to one aspect, provides a high temperature solar water-heating apparatus 10 and a low temperature solar water-heating apparatus 11 both of which may be supported on and incorporated into an exposed roof 12 in such manner that their application to the roof does not overly distract from the appearance of the roof 12. In order to achieve this, the properties of both plastic and metal are combined by providing a metal roofing sheet 13 of the type having a rectangular body portion 14 extending between upstanding complementary side engagement portions 15 and 16 in known manner but which varies from the standard sheet by the provision of re-entrant recesses 17 formed in the body portion 14 adapted to closely accommodate plastic water ducting 18 therein. As the ducting 18 is of a resilient nature being formed of say P.V.C. or similar material, it may be sprung into the recess 17 by forcing it past the restricted entrance thereto into the diverging recess and the width dimension of the recess 17 is less than the overall width of the ducting 18 so that when the ducting is operatively engaged in the recess 17, it will be held against displacement from its operative position.

In this embodiment, the ducting 18 extends down the roof surface and includes four circular cross-section passageways 19, two of which are adapted to communicate at their upper end with an inlet header 20 while the other two are adapted to communicate at their corresponding upper ends with the outlet manifold 21. Transfer means 22 are provided at the lower ends of the ducting 18 to transfer the water from the passageways communicating with the inlet header 20 to the pasageways communicating with the outlet manifold 21. As shown, the transfer means comprise U shaped round tubes which are so dimensioned as to be a tight plug-in fit into the passageways 19. The plug-in connection may be formed with a plastic solvent glue or the like to weld the transfer means to the ducting to prevent leakage.

Figure 1:
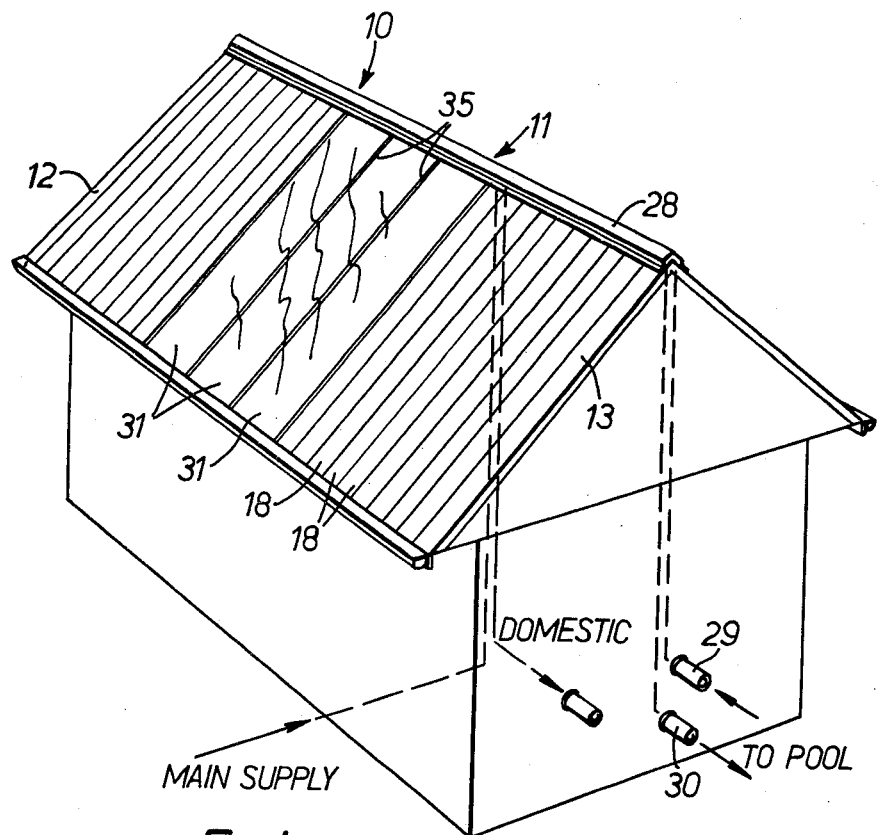
FIG. 1 illustrates generally a typical solar water-heeating installation according to the present invention.
Figure 3:
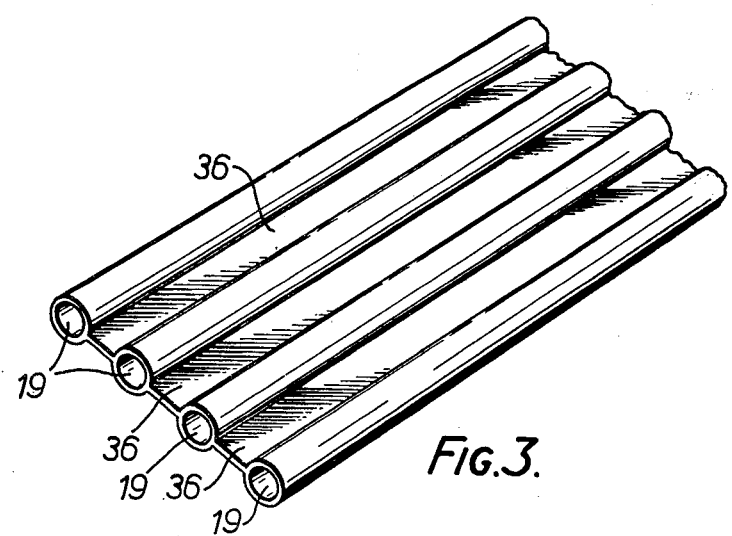
FIG. 3 is a perspective view of a preferred form of the ducting according to the present iinvention.
Figure 4:
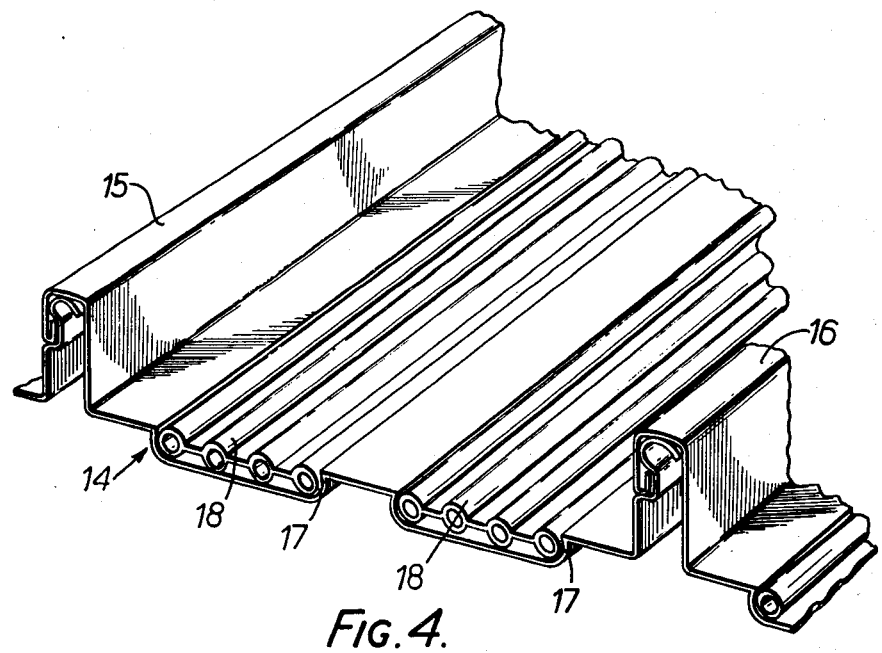
FIG. 4 is a cut-away perspective view showing the ducting supported operatively in the re-entrant recesses of a roof sheet.
Figure 5:
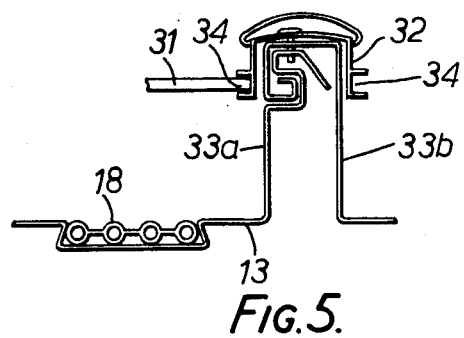
FIG. 5 is an end view showing the connection of a glazing panel to the roof sheet.
Figure 6:
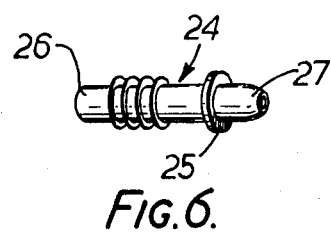
FIG. 6 is a perspective view of the tubular adaptor for connecting the passageways of the ducting to the inlet header and the outlet manifold.
Figure 7:
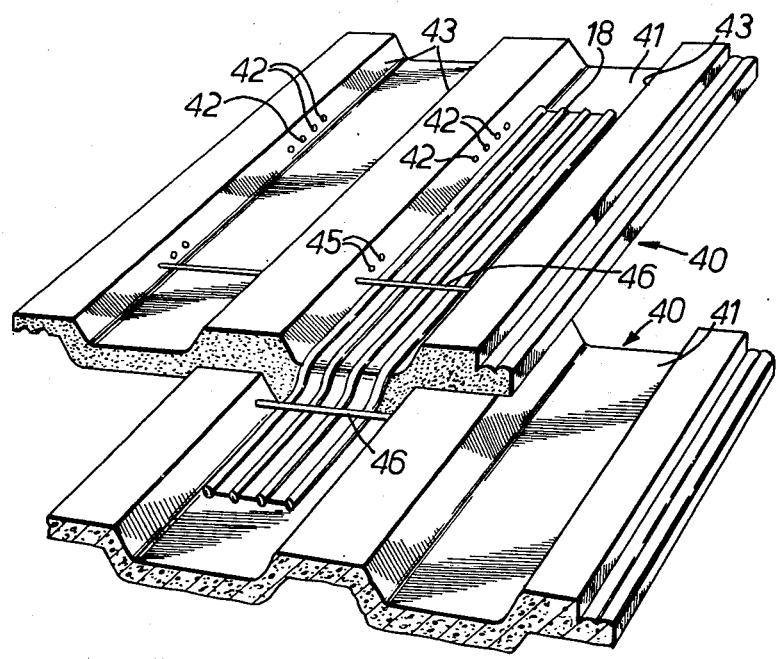
FIG. 7 is a perspective view of a pair of roof tiles shown in operative relationship with the ducting of the present invention fixed thereto.

The upper plug-in connections 23 made between the passageways 19 and the inlet header 20 or the outlet manifold 21 are formed by means of a tubular adaptor 24 as shown in FIG. 6 which has an intermediate abutment flange 25 separating an enlarged ribbed end 26, adapted for sealing plug-in connection with the respective passageway, and a smaller diameter spigot end 27 adapted for plug-in connection to the respective aperture formed in their inlet header 20 or outlet manifold 21. Preferably the ducting is made of P.V.C. as is the transfer means 22, the adaptor 24 and the inlet header 20 and the outlet manifold 21. If necessary, solvent glue can be used to seal the connection between the adaptor 27 and the header 20 or manifold 21 which may be supported out of sight beneath the ridge cap 28 of the roof 12.

The heating apparatus illustrated in FIG. 2 is adequate for low temperature heating purposes such as for heating pools or for space heating and for this purpose, water is supplied to the inlet header 20 from the pool pumping plant via piping 29 and is returned from the outlet manifold via the piping 30. However, such an installation is not adequate for supplying normal domestic hot water mainly due to the heat losses from the ducting 18 by convection preventing the necessary high temperature being attained. Accordingly, for domestic hot water heating purposes there is additionally provided a transparent cover panel 31 adapted to be supported spaced above the ducting 18 by means of supporting clips 32 which engage over the upstanding side engagement portions 33a and 33b and have outwardly directed channels 34 for engagement with the longitudinal edges 35 of the panels 31. The panel minimises heat loss from the ducting 18 so that the temperature of the water therein may be elevated to the desired temperature. In order that the ducting 18 may withstand the additional temperatures and/or pressures, it may be formed in a stronger version having say greater thickness dimensions, or say formed of a different material, more suited to the particular application. Of course, during installation the ducting 18 may be cut to any desired length and the webs portions 36 between the respective passageways 19 may be slit to enable the respective passageways which engage the inlet header and the outlet manifold to be cut to length to suit the location of the inlet header and the outlet manifold and bent upwards to facilitate plug-in connection therewith, as clearly shown in FIG. 2.

A feature of the present invention is that the ducting 18 nests in close contact with the roof surface so that heat is absorbed directly from the sun and indirectly from the roof which forms a large heat sink to collect the enrgy from the sun for transference to the ducting 18. This indirect heating is enhanced by the close fit of the ducting 18 within the recess 17 which provide areas for heat transference along the bottom face of the ducting 18 and also along the side faces of the outer pair of passageways 19. Preferably the ducting 18 is formed of black P.V.C. material or other material coloured to blend with the colour of the roofing.

Figure 8:
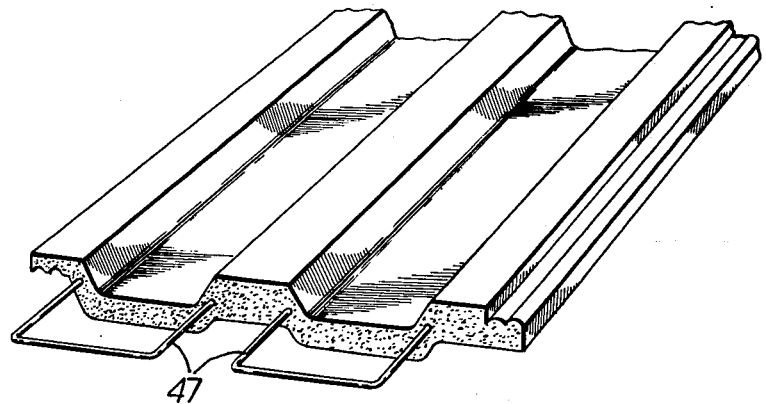
FIG. 8 is a perspective view of an alternate form of tile for use with the invention.
Figure 9:
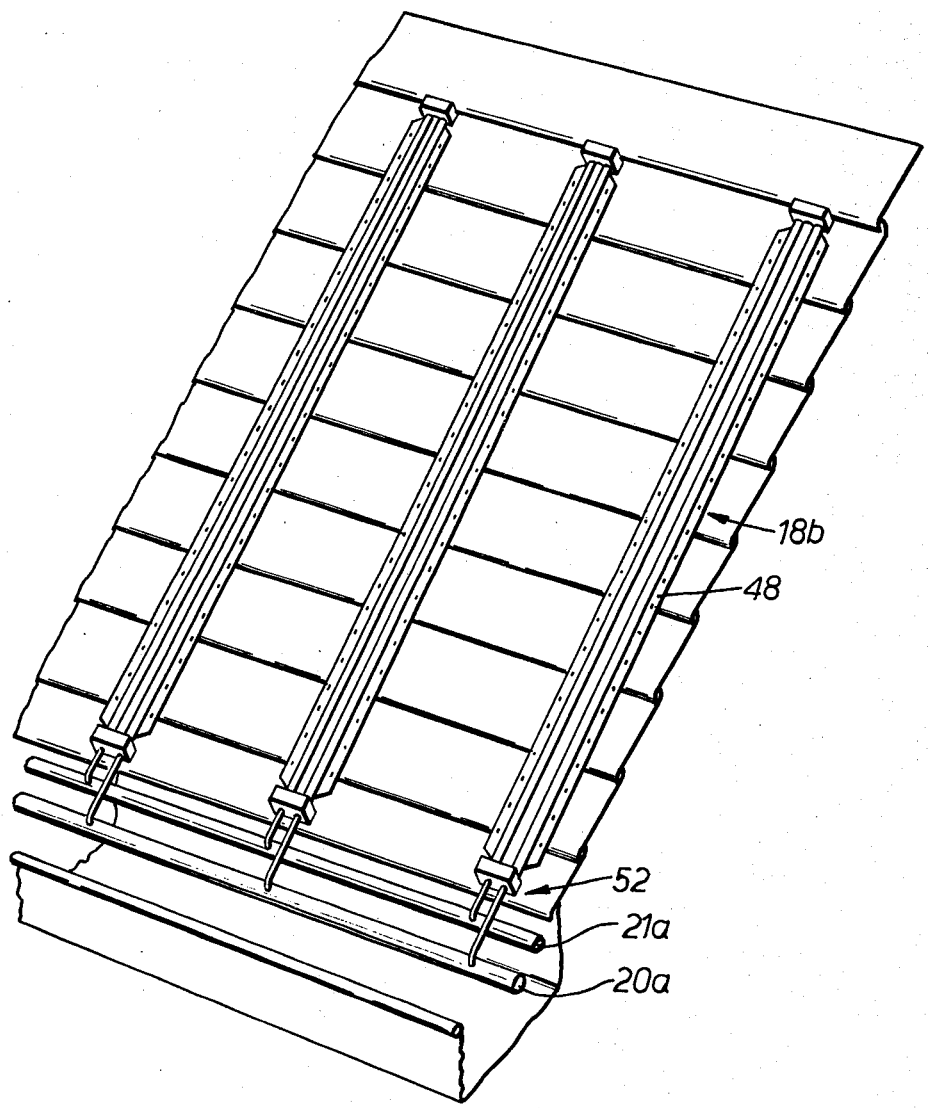
FIG. 9 is a diagrammatic perspective view illustrating the installation of a further embodiment of the invention.

The heating apparatus of the invention may be incorporated on a tiled roof and for this purpose the present invention provides roofing tiles 40 adapted to enable the ducting 18 to be secured in the recesses 41 formed in the tiles. In one form, the tile 40 is provided with a plurality of transversely aligned indents 42 at one end and indents 45 at the opposite end and along the opposite upstanding faces 43 at each side of the receses 41 and into any one transversely aligned pair of which a flexible pin 46 may be inserted above the ducting 18 to retain it in the recess 41. As shown, this arrangement enables the ducting 18 to be clamped at either side of the step from one tile to the next so that it is maintained in close contact with the tile for good appearance and to achieve maximum heat absorption from the tiles. An alternate form of roofing tile is illustrated in FIG. 8 in which a bendable U shaped tab 47 is fixed into the end of the tile and which may be bent in use to bear down against the top surface of the ducting 18 to maintain it in position.

In the embodiment illustrated in FIGS. 9 to 13, the arrangement is similar except that the ducting 18b includes three semi-circular passageways 19b extending between perforated edge portions 48. The perforated edge portions 48 are adapted to be engaged in headed spigots 49 of a retention clip 50 which has a flat portion which may be engaged between the joint between tiles or roof panels to secure the ducting 18b to the roof. Furthermore, the transfer means includes a two-into-one adaptor 51 as shown in FIG. 11 and the plug-in connectors 52 for forming the connection between the ducting 18b and the inlet header 20a and the outlet manifold 21a includes a two-into-one adaptor together with a regulating valve 53 on the straight-through passage 19c. In this embodiment the header and the outlet manifold are supported out of sight in the roof gutter.

Of course it will be realised that the above has been given by way of illustrative example only, and all such modifications and variations as would be apparent to persons skilled in the art are deemed to fall within the broad scope and ambit of the invention as is defined in the appended claims.

I claim:

1. Solar water-heating apparatus including
a header having an inlet for water to be heated,
a duct assembly,
a manifold arranged to communicate with said header through said duct assembly,
a hot water discharge outlet from said manifold,
said duct assembly having a plurality of spaced-apart ducting members each being adapted to communicate with, for through-flow between, said header and said manifold through a respective one of a plurality of spaced-apart, plug-in connections provided along said header and said manifold, said ducting being a resilient plastic extrusion member of indefinite length and having a plurality of substantially identical passageways extending longitudinally therethrough and disposed in spaced side-by-side relationship, and a roof sheet for supporting said ducting, said roof sheet having a rectantular body portion, upstanding complementary side engagement portions, said body portion extending between said upstanding complementary side engagement portions whereby said sheet may be connected in operative edge-to-edge overlapping relationship with a similar sheet at each side thereof and said rectangular body portion including a re-entrant recess extending parallel to said engagement portions and arranged to closely accommodate therein said resilient ducting whereby the latter may be operatively retained in said recess by forcing said ducting through the entrance of and into said re-entrant recess.

2. Solar water-heating apparatus including a header having an inlet for water to be heated, a duct assembly adapted to be supported directly on a sun-exposed supporting surface, a manifold arranged to communicate with said header through said duct assembly, a hot water discharge outlet from said manifold, said duct assembly having a plurality of spaced-apart ducting members each being adapted to communicate with, for through-flow between, said header and said manifold through a respective one of a plurality of spaced-apart, plug-in connections provided along said header and said manifold, said header and said manifold being of elongated tubular form and adpated to be disposed in side-by-side relationship across said supporting surface and include a plurality of spaced apertures for said plug-in connections and each said ducting comprises an elongate plastic extrusion member including a pair of enclosed passageways extending therethrough, one said passageway being adapted to communicate at one end through said plug-in connection with said header and the other said passageway being adapted to communicate at its corresponding end through said plug-in connection with said manifold and there being provided transfer means cooperating with said ducting remote from said header and said manifold for transferring water from said one pasageway to said other passageway, said transfer means comprising a hollow body having a pair of tubular inlet-cum-outlet spigots each being adapted to be forced into sealing plug-in engagement with the bore of a respective one said passage-way for transferring water from the said one passageway to said other passageway, and wherein each said plug-in connection between said ducting and said header or said manifold is made by means of a tubular adaptor adapted to be forced into sealing engagement at one end with the bore of said passageway and at its other end into sealing engagement with the respective said aperture, and said supporting surface being a roof formed of a plurality of edge overlapping sheets each having a rectangular body portion extending between upstanding complementary side engagement portions whereby said sheet may be connected in operative edge-to-edge overlapping relationship with a similaar sheet at each side thereof and said rectangular body portion including a re-entrant recess extending parallel to said side engagement portions and arranged to closely accommodate therein said resilient ducting whereby the latter may be operatively retained in said recess by forcing said ducting through the entrance of and into said re-entrant recess.

3. Solar water-heating apparatus according to claim 2, wherein there is provided a solid transparent panel spaced above said rectangular body portion so as to prevent heat loss by convection from said ducting supported beneath said panel, the latter being supported edgewise along said complementary side engagement portions.

4. Solar water-heating apparatus according to claim 3, wherein there are provided supporting clips adapted to be engaged over each said upstanding portion of said roof sheet to provide at each side thereof a recess adapted to operatively engage the edge of said panel to support same.

5. Solar water heating apparatus of the type including an inlet manifold and an outlet manifold and an absorber assembly supported on an exposed roof and being constituted by a plurality of elongate flexible plastic ducting members having a passageway therethrough through which fluid may flow from said inlet manifold to said outlet manifold; characterized in that said exposed roof comprises a roof having a plurality of contintuous spaced-apart recesses extending thereacross and in that each said flexible ducting member is supported directly on said exposed roof and is constrained within a respective said recess.

6. Solar water heating apparatus according to claim 5, wherein each said passageway is connected to the respective said inlet manifold or outlet manifold by means of a push-in connector having a pair of spigot connector ends, a respective one of which is adapted to be forced into sealable engagement with said passageway and the other said spigot end being adapted to be forced into sealable engagement with an aperture formed in the respective said inlet manifold or said outlet manifold.

7. Solar water heating apparatus according to claim 5 wherein said roof is a metal roof including a plurality of roof sheets each having a rectangular body portion, each said rectangular body portion including a said recess, each said recess being constituted by a re-entrance recess extending longitudinally of said sheet and arranged to closely accommodate therein a respective said ducting member whereby the latter may be operatively constrained with said recess by forcing said ducting member through the entrance of and into the said re-entrance recess.

8. Solar water heating apparatus according to claim 5 wherein said roof is a tile roof comprising a plurality of overlapping tiles each having a depression extending thereacross which is adapted to be aligned with complementary depressions of the adjacent tiles so as to form a respective said recess extending across said roof and wherein said ducting members are constrained in respective said recesses by clip means adapted to be engaged with said tiles above said ducting members to secure said ducting members in said recesses.

9. Solar water heating apparatus including a header having an inlet for water to be heated, a duct assembly adapted to be supported directly on a roof or other sun-exposed supporting surface, a manifold arranged to communicate with said header through said duct assembly, a hot water discharge outlet from said manifold, said duct assembly having a plurality of spaced-apart ducting members each being adapted to communicate with, for through-flow between, said header and said manifold through a respective one of a plurality of spaced apart, push-fit plug-in connections provided along said header and said manifold, said header and said manifold being of elongated tubular form and adapted to be disposed in side-by-side relationship across said supporting surface and include a plurality of spaced apertures for said plug-in connections and each said ducting member comprises an elongate plastic extrusion member including a pair of enclosed passageways extending therethrough, one said passageway being adapted to communicate at one end through said plug-in connection with said header and the other said passageway being adapted to communicate at its corresponding end through said plug-in connection with said manifold and there being provided transfer means co-operating with said ducting member remote from said header and said manifold for transferring water from said passageway to said other passageway, said transfer means comprising a hollow body having a pair of tubular inlet-cum-outlet spigots each being adapted to be forced into sealing plug-in engagement with the bore of a respective one said passageway for transferring water from the said one passageway to said other passageway, and wherein each said plug-in connection between said ducting and said header or said manifold is made by means of a tubular adaptor adapted to be forced into sealing engagement at one end with the bore of said passageway and at its other end into sealing engagement with the respective said aperture.

10. Solar water heating apparatus including an inlet manifold, an outlet manifold and an absorber assembly through which fluid may pass from said inlet manifold to said outlet manifold and said absorber assembly being constituted by a plurality of elongate flexible ducting members supported directly on a metal roof, said metal roof comprising a plurality of roof sheets each having a rectangular body portion extending between upstanding complimentary side engagement portions whereby each said sheet may be connected in operative edge to edge overlapping relationship with a similar sheet at each side thereof and said rectangular body portion including a recess extending parallel to said side engagement portions for locating said flexible ducting members, each said ducting member having at least a pair of passageways extending longitudinally therethrough whereby each passageway of the respective ducting members may be operatively connected at its end adjacent said manifolds to a respective one of said inlet manifold or said outlet manifold by means of a push-in connector having a pair of spigot connector ends adapted to be forced into sealable engagement with said passageway and an aperture formed in said inlet manifold or said outlet manifold and there being provided a transfer duct assembly for each said ducting member, said transfer duct assembly having a pair of push-in spigot connector ends each adapted to be forced into sealable engagement with a respective one said passageway at the end of said ducting member remote from said manifolds to interconnect said passageways whereby liquid may flow from said inlet manifold through one said passageway for return to said outlet manifold through the other said passageway of each said ducting member.

11. Solar water-heating apparatus according to claim 10, wherein said inlet manifold and said outlet manifold are flexible pipe formed of plastics material whereby the apertures therein for said spigot connectors may be formed on site and wherein said spigot connectors are formed of plastics material.

12. Solar water-heating apparatus according to claim 11, wherein each said ducting member includes four substantially identical and spaced apart passageways each passageway having a circular cross-sectional configuration and being formed within a respective tubular housing portion and there being provided continuous connecting webs extending along said ducting member and between adjacent tubular housing portions.

13. Solar water-heating apparatus according to claim 10, wherein the width of said recess is substantially equal to the overall width of said ducting members.

14. Solar water-heating apparatus according to claim 10, wherein there is provided a light transmitting panel spaced above said body portion so as to prevent heat loss by convection from said ducting member supported beneath said panel, the latter being supported edgewise along said complimentary side engagement portions.

15. Solar water-heating apparatus according to claim 14, wherein there are provided supporting clips adapted to be engaged over each said upstanding portion of said roof sheet to provide at each side thereof a recess adapted to operatively engage the edge of said panel to support same.

16. Solar water heating apparatus including an inlet manifold, an outlet manifold and an absorber assembly through which fluid may pass from said inlet manifold to said outlet manifold and said absorber assembly being constituted by a plurality of elongate flexible ducting members supported directly in spaced side by side relationship on a tile roof and each being located in respective aligned recesses formed in overlapping tiles, and there being provided clip means adapted to be engaged between the sides of the respective tile recesses above said ducting members to secure said ducting members in said recesses and each said ducting member having at least a pair of passageways extending longitudinally therethrough whereby each passageway of the respective ducting members may be operatively connected at its end adjacent said manifolds to a respective one of said inlet manifold or said outlet manifold by means of a push-in connector having a pair of spigot connector ends adapted to be forced into sealable engagement with said passageway and an aperture formed in said inlet manifold or said outlet manifold and there being provided a transfer duct assembly for each said ducting member, said transfer duct assembly having a pair of push-in spigot connector ends each adapted to be forced into sealable engagement with a respective one said passageway at the end of said ducting member remote from said manifolds to interconnect said passageways whereby liquid may flow from said inlet manifold through one said passageway for return to said outlet manifold through the other said passageway of each said ducting member.

17. Solar water heating apparatus according to claim 16, wherein said inlet manifold and said outlet manifold are flexible pipe formed of plastics material whereby the apertures therein for said spigot connectors may be formed on site and wherein said spigot connectors are formed of plastics material.

18. Solar water heating apparatus according to claim 17, wherein each said ducting member includes four substantially identical and spaced apart passageways each passageway having a circular cross-sectional configuration and being formed within a respective tubular housing portion and there being provided continuous connecting webs extending along said ducting member and between adjacent tubular housing portions.

19. Solar water heating apparatus including juxtapositioned inlet manifold and outlet manifold and an absorber assembly through which fluid may pass from said inlet manifold to said outlet manifold and said absorber assembly being constituted by a plurality of elongate flexible plastic ducting members supported directly on a metal roof, said metal roof being formed from a plurality of metal sheets each having a rectangular body portion extending between upstanding complementary side engagement portions whereby each said sheet may be connected in operative edge-to-edge overlapping relationship with a similar sheet at each side thereof and wherein said rectangular body portion of each said sheet is provided with a recess which extends along said sheet parallel to said side engagement portions, each said recess being adapted to nestingly receive a respective said ducting member and having a width substantially equal to the overall width of said ducting member, and each said ducting member having at least a pair of passageways extending longitudinally therethrough whereby each passageway of each respective ducting member may be operatively connected at one end of said ducting member to a respective one of said inlet manifold or said outlet manifold and there being provided a transfer duct assembly for each ducting member to interconnect said passageways at their other end whereby liquid may flow from said inlet manifold through one said passageway for return to said outlet manifold through the other said passageway.

20. Solar water heating apparatus according to claim 19, wherein each said ducting member includes a plurality of substantially identical and spaced-apart passageways each passageway having a circular cross-sectional configuration and being formed within a respective tubular housing portion and there being provided continuous connecting webs extending along said ducting member and between adjacent tubular housing portions.

21. Solar water heating apparatus according to claim 20, wherein said recess diverges from its open face the width of which is slightlyless than the overall width of said ducting member so as to provide a restricted opening to said recess, said restricted opening constituting said constraint.

22. Solar water heating apparatus according to claim 19, wherein there is provided a light transmitting panel spaced above said body portion so as to prevent heat loss by convection from said ducting member supported beneath said panel, the latter being supported edge wise along said complementary side engagement portions.

23. Solar water heating apparatus according to claim 22, wherein there are provided supporting clips adapted to be engaged over each said upstanding side portion of said roof sheet to provide at each side thereof a recess adapted to operatively engage the edge of said panel to support same.

24. A metal roofing sheet for the solar water heating apparatus as defined in claim 19, said metal roofing sheet having a rectangular body portion extending between upstanding complementary side engagement portions whereby said sheet may be connected in operative edge-to-edge overlapping relationship with a similar sheet at each side thereof and said rectangular body portion including a recess extending parallel to said side engagement portion and arranged to closely accommodate therein said ducting member.

25. A metal roofing sheet according to claim 24, wherein the width of the open face of said recess is slightly less than the overall width of said ducting member and said recess diverges inwardly, said restricted open face of said recess constituting said constraint.

26. Solar water heating apparatus including juxtapositioned inlet manifold and outlet manifold and an absorber assembly through which fluid may pass from said inlet manifold to said outlet manifold and said absorber assembly being constituted by a plurality of elongate flexible plastic ducting members supported directly on a tile roof said tile roof comprising a plurality of overlapping tiles each having a pair of depressions extending thereacross which are adapted to align with complementary depressions of the adjacent tiles so as to form recesses extending across the roof and wherein said ducting members are constrained in the respective said recesses by means of a clip fixed to said tiles and being adapted to overlie said ducting member adjacent the overlap of the respective tiles, each said ducting member having at least a pair of passageways extending longitudinally therethrough whereby each passageway of each respective ducting member may be operatively connected at one end of said ducting member to a respective one of said inlet manifold or said outlet manifold and there being provided a transfer duct assembly for each said ducting member to interconnect said passageways at their other end whereby liquid may flow from said inlet manifold through one said passageway for return to said outlet manifold through the other said passageway.

* * * * *

UNITED STATES PATENT AND TRADEMARK OFFICE
CERTIFICATE OF CORRECTION

PATENT NO. : 4,269,172
DATED : May 26, 1981
INVENTOR(S) : Peter D. Parker, et al It is certified that error appears in the above–identified patent and that said Letters Patent are hereby corrected as shown below:

Column 1, line 61, "heeating" should be "heating"

Column 2, line 17, "illstrates" should be "illustrates"

Column 4, line 2, "enrgy" should be "energy"

Column 5, line 43, "pasageway" should be "passageway"

Column 5, line 63, "similaar" should be "similar"

Column 6, line 23, "contintuous" should be "continuous"

Column 9, line 44, "slightlyless" should be "slightly less"

Column 10, line 1, "edge wise" should be "edgewise"

Signed and Sealed this

Eleventh Day of August 1981

[SEAL]

Attest:

GERALD J. MOSSINGHOFF

Attesting Officer

Commissioner of Patents and Trademarks